United States Patent [19]

Carter et al.

[11] 3,795,386
[45] Mar. 5, 1974

[54] SHAFT SEAL FOR LOW AND HIGH PRESSURES

[75] Inventors: Don E. Carter, Creve Coeur, Mo.; George A. Latinen, deceased, late of Springfield, Mass. by May V. Latinen, administratrix

[73] Assignee: Monsanto Company, St. Louis, Mo.

[22] Filed: Aug. 16, 1971

[21] Appl. No.: 172,060

[52] U.S. Cl............. 259/191, 100/145, 259/DIG. 16, 277/32
[51] Int. Cl............................. F16j 15/14, B29b 1/10
[58] Field of Search.... 100/117, 145; 425/242, 376; 259/191, DIG. 16; 277/133, 134, 3, 27, 32, 28, 203, 216

[56] References Cited
UNITED STATES PATENTS

| | | | |
|---|---|---|---|
| 3,593,379 | 7/1971 | Hendry | 259/191 |
| 3,300,810 | 1/1967 | Gregory et al. | 259/191 |
| 3,131,940 | 5/1964 | Ertaud | 277/28 |
| 3,364,523 | 1/1968 | Schippers | 277/134 |
| 3,331,101 | 7/1967 | Thomas, Jr. | 277/134 |
| 3,354,504 | 11/1967 | Lehner | 259/191 |
| 3,622,164 | 11/1971 | Herbert et al. | 277/134 |
| 1,527,681 | 2/1925 | Hanson | 277/203 |
| 3,355,179 | 11/1967 | McGrew, Jr. | 277/134 |

*Primary Examiner*—Robert W. Jenkins
*Assistant Examiner*—Stuart S. Levy
*Attorney, Agent, or Firm*—Joseph S. Nelson; Edward P. Grattan; James C. Logomasini

[57] ABSTRACT

A feed assembly adapted for incorporation into a devolatilizer, extruder, or the like which enables one to deliver a pressurized fluid mass intermittently to a chamber maintained under reduced pressure relative to the entering fluid mass from a region circumferentially located about a revolving shaft. The assembly utilizes two coaxial, adjacent viscoseal-type sealing screws located about the shaft. An annular region about the shaft between the viscoseal-type sealing screws and the reduced pressure chamber maintains fluid pressure in input fluid so that these sealing screws are rendered operable. One such sealing screw seals against normal fluid pressure, the other against reduced pressure chamber pressures when fluid pressure is lost.

7 Claims, 7 Drawing Figures

INVENTORS
DON E. CARTER,
GEORGE A. LATINEN
BY *John W. Klooster*
ATTORNEY

INVENTORS
GEORGE A. LATINEN,
DON E. CARTER

BY *John W. Klooster*
ATTORNEY

SHAFT SEAL FOR LOW AND HIGH PRESSURES

BACKGROUND

In the operation of removing low boiling materials from higher boiling ones in the high polymer field, the art has come to employ devolatilization equipment for removing lower boiling materials from solid particles and pellets (for example, in vented extruders) and from polymers in liquid solutions of their monomer or other solvent, such as are obtained in mass or solution polymerization processes (for example, in devolatilizers, such as those of the wiped film type).

In wiped film devolatilizers, a fluid mass comprising a polymer melt with monomer and/or solvent dissolved therein is fed through a treatment chamber in which such fluid mass is subjected to temperature and pressure conditions favoring volatilization of the lower boiling fraction. In passing through such chamber, the fluid mass is spread into a thin film to accelerate monomer or solvent vapor separation from the high boiling polymeric fraction. Elevated temperatures and subatmospheric pressures are commonly employed in such chamber. When the fluid mass to be so devolatilized is being fed under pressure to the treatment chamber circumferentially of the screw shaft of the screw assembly used to spread the fluid mass into a thin film in, and to move the fluid mass through, such treatment chamber, a problem arises in continuously delivering the fluid mass to treatment chamber because of the difficulties of maintaining adequate seals around the screw shaft. The problem is heightened when the fluid mass is viscous and is to be fed continuously to treatment chamber.

Prior art techniques for sealing shafts entering devolatilizers generally involve the use of packed stuffing boxes or of mechanical seals. Stuffing boxes generally have some tendency to leak in vacuum service. Typically, they require considerable attention and frequent tightening and even replacement of worn packing to keep them in satisfactory operating condition. In addition, the product being processed may be contaminated by particles of worn packing and by any lubricant which may be necessary or desirable in the stuffing box.

Mechanical seals are usually less subject to leakage and wear; they too require occasional replacement and may be subject to lubricant and/or coolant leakage when lubricant or coolant is required. When mechanical seals are used on high viscosity fluids, such as a polymer melt or solution of polymer is monomer, these fluids tend to cause the sealing means between the rotating shaft and the rotating seal face to become stuck or frozen and this result does not permit the axial movement of the rotating seal face which is necessary for proper operation of a mechanical seal.

Some mechanical sealing contrivances, such as a conventional viscoseal-type shaft sealing screw, appear to be more reliable, but generally require superatmospheric, as opposed to subatmospheric, pressures. Furthermore, such devices commonly operate only at some predetermined fluid pressure/fluid viscosity/shaft speed interrelationship which does not apply in a situation where, because of normal process considerations or even a process malfunction, an interruption occurs in the normal fluid flow. In such an event, such a device causes a pressure loss from a devolatilizer, which is highly undesirable and which in itself can cause a continuous polymerization/devolatilization process to shut down.

There has now been discovered a relatively simple technique for charging a continuously pressurized fluid mass intermittently to a chamber maintained normally at a reduced pressure relative to the normal pressure associated with such fluid mass (e.g., the treatment chamber is a wiped film devolatilizer). The technique permits so charging a fluid circumferentially of a shaft revolving in the chamber. If for some reason, fluid flow is interrupted, the reduced pressure in the chamber is not lost. The technique avoids the use of conventional packing materials and employs the fluid itself in perfecting the seal. The technique is economical and produces reliable, long lasting seals suitable for prolonged periods for continuous operation.

The technique uses viscoseal-type sealing screw assemblies. A viscoseal-type sealing screw assembly can be regarded as a single screw pump of the type which operates by making use of the rotation of the shaft and of the viscosity of the fluid being pumped.

Thus, in a conventional viscoseal-type sealing screw assembly, within a hub region defined in a housing adjacent a pressurized fluid filled zone where a revolving shaft extends axially therethrough, reverse screw threads are located. The threads are located either on the hub or on the shaft. The threads extend circumferentially about the shaft and the hub. When the shaft rotates at a predetermined speed and fluid from the pressurized zone is pushed against the threads, a seal is formed between the hub and the shaft by the fluid and the threads.

Grooves between thread ribs fill with fluid and bridge a small gap between hub and shaft. Because the fluid in a groove has substantial viscosity, it tends to be dragged along by the revolving shaft in a circumferential direction. Such fluid movement, however, is stopped by a screw thread whose land area acts as a barrier to such fluid flow. At such barrier, the force exerted on such fluid may be resolved into a normal component perpendicular to the walls of the groove formed by adjacent threads and a component parallel to the direction of the groove formed by the threads. Since the groove is open at the end, the tendency of the force exerted parallel to the groove is to cause movement of the fluid along the groove. In a conventional viscoseal-type seal-type sealing screw, the groove fills until the force exerted parallel to the groove equals the pressure force at the end of the groove.

SUMMARY

The present invention is directed to a feed assembly adapted for incorporation into a devolatilizer or the like to deliver a relatively viscous fluid mass to a chamber maintained under reduced pressure (relative to atmospheric) circumferentially along a revolving shaft. The feed assembly utilizes a substantially gas tight, fluid tight housing with appropriate apertures defined therein.

The housing has defined therewithin at successive adjoining regions along a common axis extending therethrough characteristically four zones or chambers: Two shaft sealing chambers; a fluid input chamber; and an enlarged chamber adapted to be maintained under subatmospheric pressures.

A shaft extends generally axially through the chambers and an annular space is defined between the shaft and the housing in the fluid input chamber. Viscoseal-type screw means are positioned in the shaft sealing chambers. Appropriate seals are formed between the shaft and the housing by the coaction between the melt fluid and the sealing screw means.

The present invention is particularly well suited for use in the devolatilization of mass polymerized, viscous, polymer melts (such as polystyrene or polyethylene) to remove unpolymerized monomer therefrom.

DRAWINGS

The present invention is better understood by reference to the attached drawings wherein.

DETAILED DESCRIPTION

Figure 1:
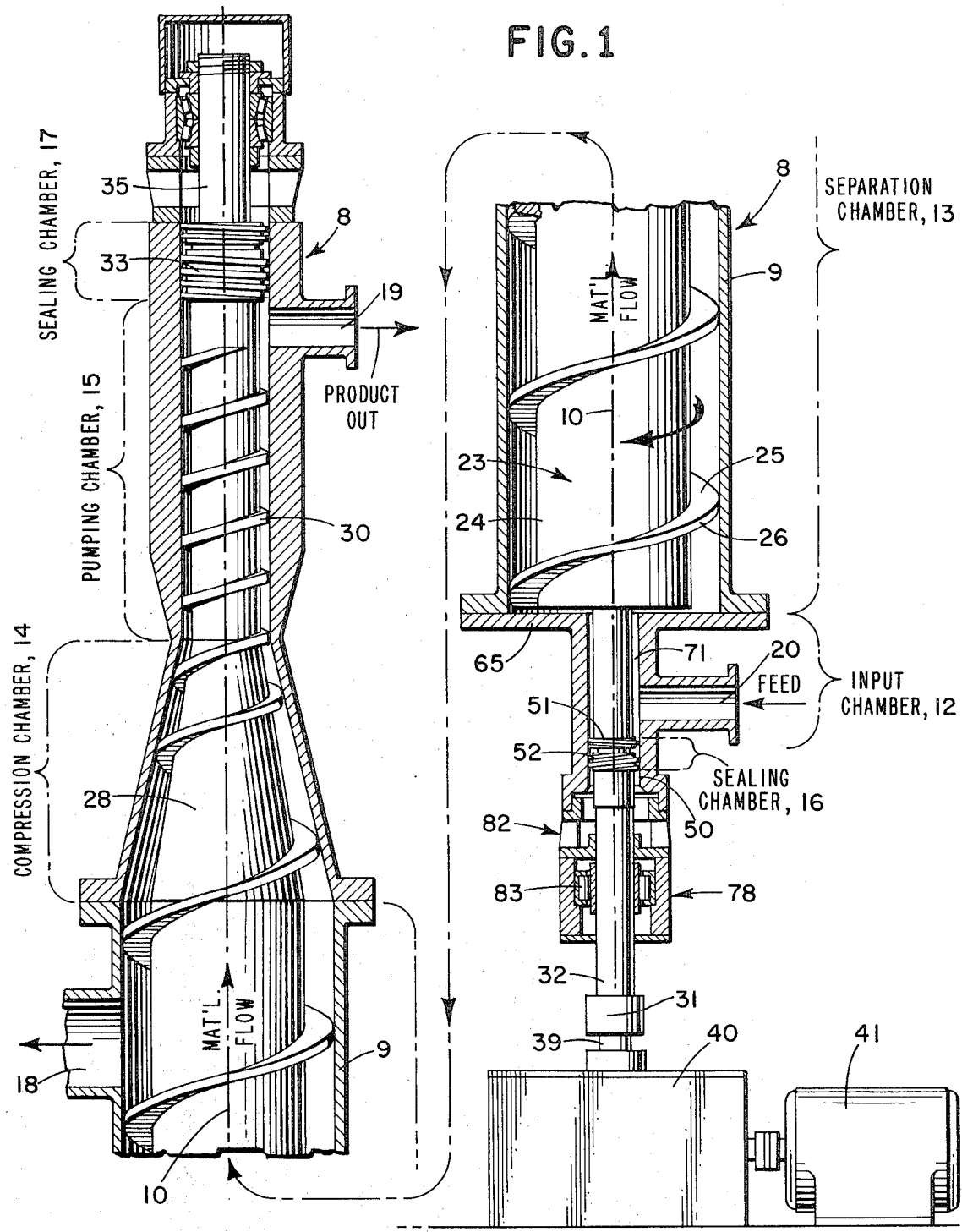
FIG. 1 is a diagrammatic representation of a wiped film devolatilizer utilizing a fluid feed assembly of this invention.

Turning to FIG. 1, there is seen a wiped film devolatilizer, herein designated in its entirety by the numeral 8. The devolatilizer 8 has a housing 9 which has therewithin, at successive adjoining regions along a common axis 10 extending therethrough, various chambers as follows: A melt input chamber 12; an enlarged, elongated, cylindrical, vapor separation chamber 13; a melt transition or melt compression chamber 14; a melt pumping chamber 15; and a lower melt sealing chamber 16; and an upper melt sealing chamber 17.

Housing 9 has defined therein various ports as follows: A vapor take-off port 18 in separation chamber 13; a melt output port 19 in the melt pumping chamber 15 adjacent the melt sealing chamber 17; a melt input port 20 in the input chamber 12; and a drive shaft entry port 50 axially located in housing 9 in sealing chamber 16. Those skilled in the art will appreciate that alternatively a drive shaft entry port (not shown) could enter sealing chamber 17.

A rotor assembly, herein designated in its entirety by the numeral 23, is positioned generally within, and generally coaxial with, the separation chamber 13. Rotor assembly 23 has an elongated shaft means 24 axially located in separation chamber 13 with blade-like, flattened helical screw portions 25 extending radially outwardly therefrom and terminating in land regions 26 at the circumferentially extending, radially outer edges thereof.

The land regions 26 are adapted to sweep by interior walls of the housing 9 in separation chamber 13 during each revolution of shaft means 24. Rotor assembly 23 is adapted during operation of devolatilizer 8 to move melt (not shown) from input chamber 12 to compression chamber 14 while concurrently spreading at least a portion of such melt over the interior walls of the housing 9 in spearation chamber 13 as a thin film (not shown). Simultaneously with such movement and such spreading, the rotor assembly 23 is adapted to permit vapors escaping from such melt to move to the vapor take-off port 18.

A compression screw means, herein designated in its entirety by the numeral 28, is generally positioned within and generally coaxial with the compression chamber 14. Compression screw means 28 is adapted to collect, compress, and convey melt from the separation chamber 13 to the pumping chamber 15 during operation of the devolatilizer 8.

A screw pump means, herein designated in its entirety by the numeral 30, is generally positioned within, and generally coaxial with, the pumping chamber 15. The screw pump means 30 is adapted to compress, convey, and pressurize melt from the compression or transition chamber 14 to the melt output port 19.

A shaft 32 extends through lower sealing chamber 16. Sealing means, here viscoseal-type reverse screws 51 and 52 on shaft 32, block passage of melt from input chamber 12 outwardly along and around shaft 32 in drive shaft entry port 50 and sealing chamber 16.

A shaft 35 extends through upper sealing chamber 17. Sealing means, here a viscoseal-type reverse screw 33 on shaft 35, block passage of melt from pumping chamber 15 outwardly along and around shaft 35 in sealing chamber 17.

Shaft 35 is integral with rotor assembly 23; rotor assembly 23 with compression screw means 28; compression screw means 28 with screw pump means 30; and screw pump means 30 with shaft 35; thereby adapting shaft 35, rotor assembly 23, compression screw means 28, extruder screw means 30, and shaft 35 for common rotational movements on common axis 10.

A drive shaft 39 is functionally associated with shaft 32 through coupling 31 and interconnects shaft 32 with transmission 40 and its interconnected motor 41 to revolvably drive shaft 32 in a direction to move melt from input port 20 to output port 19 when the devolatilizer 8 is operating.

Figure 2:
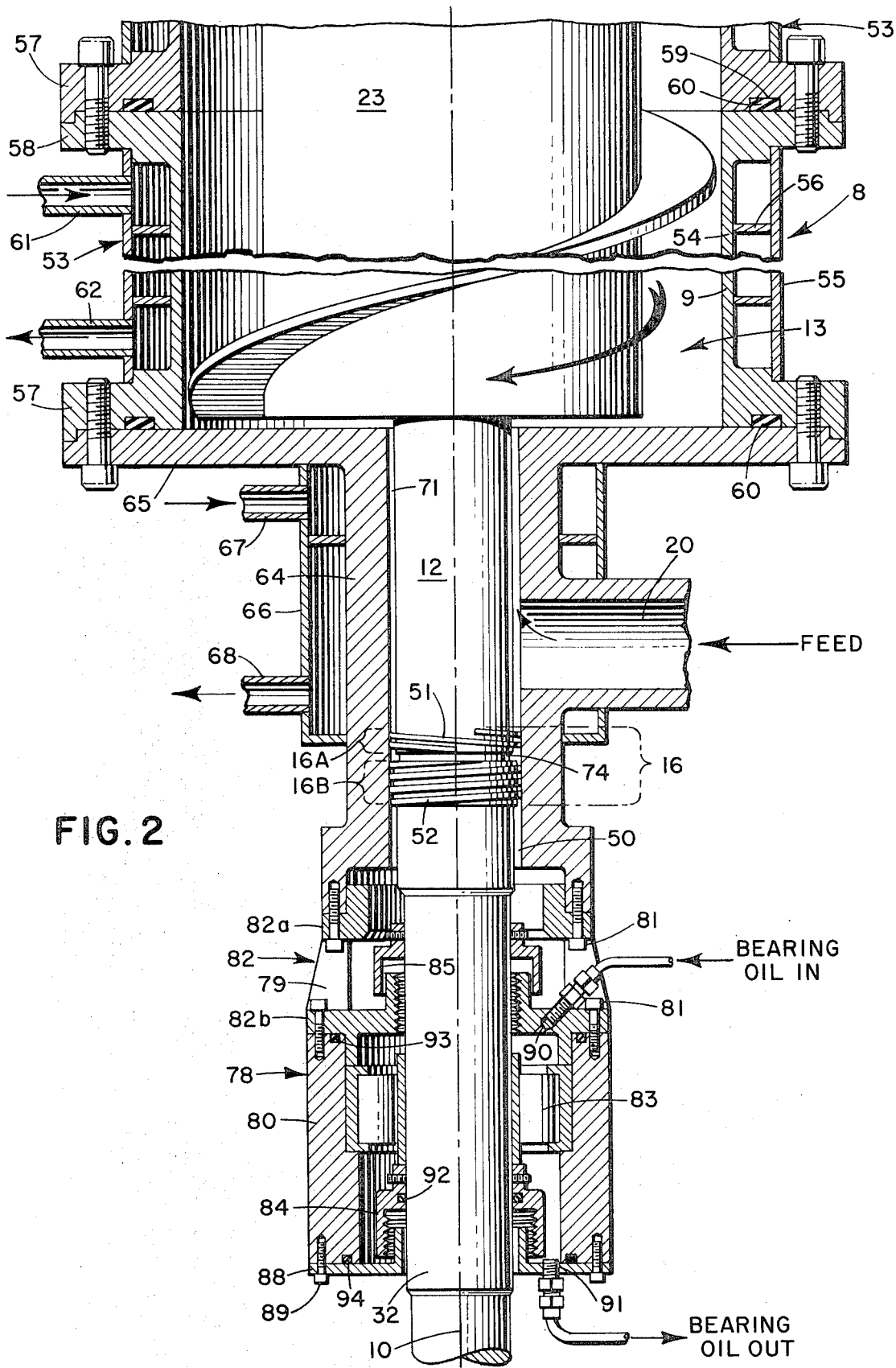
FIG. 2 is an enlarged, detailed, vertical, sectional view of the input end protion of the devolatilizer shown in FIG. 1.

Turning to FIG. 2, there is seen a detailed view portion of a devolatilizer 8 equipped with the apparatus of the present invention. Here, viscous melt material (not shown) enters devolatilizer 8 through melt fluid input port 20, passes into and through a melt fluid input chamber 12, and on into a process separation chmaber 13.

A substantially gas tight, fluid tight housing 9 has defined therewithin at successive adjacent adjoining regions generally along a common axis 10 extending therethrough a cylindrical melt sealing chamber 16 which has two adjoining regions 16A and 16B which are both coaxial with axis 10; a fluid input chamber 12 which is generally coaxial with axis 10; and a process chamber which is here the separation chamber 13 and which, though here shown generally coaxial with axis 10, need not be, as when an assembly of this inveniton is used in some other application. The housing further has defined therein a shaft input port or bore 50 which is located generally coaxially with housing 9 on axis 10. Melt fluid input port 20 enters radially into the input chamber 12 adjacent sealing chamber 16. Observe that housing 9 in the region of sealing chamber 16 and of input chamber 12 is thickened and is thereby adapted to contain predetermined fluid pressures from a pressurized fluid entering housing 9, through fluid input port 20, passing therethrough, and exiting therefrom into process chamber 13.

For reasons of constructional convenience, it is convenient to manufacture housing 9 in the form of sections or subassemblies which are assembled together to fabricate a completed housing 9. In the region of process chamber 13, typical section 53 of housing 9 is seen to comprise a double walled cylindrical construction, there being an interior cylindrical wall 54 and an outer cylindrical wall 55, the walls 54 and 55 being maintained in fixed, predetermined spaced relationship one to the other by means of spacer members 56. One end of a section 53 ends in a male flange member 57, while the other end thereof ends in a female flange member 58. In the flat, facing portion of flange 57 a circular groove 59 is provided for receipt of a conventional seal 60. Thus, in an assembled housing 9, flanges 57 and 58, one each on abutting, paired sections 53, matingly engage in sealed relationship between one another by means of seal 60.

It will be appreciated that a devolatilizer 8 is conveniently formed of steel with individual pieces thereof being welded, clamped together, or the like. Thus, individual sections 53 are welded together, but abutting sections 53 are clamped together at adjoining flanges (by such means as screws or C-clamps, or the like).

A section 53 is constructed so that inner wall 54 and outer wall 55 are in fluid tight relationship to one another, in cooperation with flanges 57 and 58 and spacer members 56 so that (typically, though not necessarily) a heating fluid can be circulated therebetween, thereby to heat a section 53 in a controllable manner. Such a heated fluid is conveniently injected through input nozzle 61 into section 53 and removed therefrom through output nozzle 62.

In the region of the sealing chamber 16 and the input chamber 12, housing 9 is conveniently formed by a heavy walled tubular member 64 which is flared at its open end (relative to the process chamber 13). An end flange 65 on a tubular member 64 serves to interconnect member 64 with a section 53 of chamber 13 as by screws or the like. Member 64 is surrounded by a jacket 66 for circulation of heating fluid therethrough using an input nozzle 67 and an output nozzle 68.

Revolvably mounted shaft 32 is positioned in housing 9 so as to be generally coaxial with axis 10 yet extend through shaft bore 50, both sealing chambers 16A and 16B, and input chamber 12, and project into process chamber 13. Shaft 35 in input chamber 12 defines in combination with housing 9 an annular space 71 circumferentially thereof. Space 71 is adapted for the flow of fluid therethrough and into process chamber 13 from input or conduit 20.

A conventional bearing assembly, herein designated in its entirety by numeral 78, journals shaft 32 for rotational movements. Bearing assembly 78 is isolated from the main body of housing 9 (and from first and second sealing chambers 16A and 16B respectively) by a spacer ring 82. Spacer ring 82 is comprised of two flanges 82a and 82b spaced apart by a plurality of radially spaced longitudinally extending ribs 79 integral therewith. Screws 81 interconnect spacer ring 82 with tubular member 64 and bearing assembly housing 80 through flanges 82a and 82b, respectively. Housing 80 supports a bearing 83 which engages shaft 32. Bearing assembly 78 is closed at its upper end by flange 82b and at its lower end by flange 88. A cap 85 covers the opening of flange 82b near the shaft 32 and prevents melt material from falling into the bearing 83. A rotatable cap 84 similarly covers the opening of flange 88 to prevent bearing lubricant oil (not shown) from leaking out of bearing housing 80 along the shaft 32.

To lubricate and cool bearing assembly 78, oil (not shown) is injected into bearing 83 through an orifice 90, circulated, and removed through orifice 91. O-ring seal 92 in a mating groove in cap 84 and O-ring seals 93 and 94 in mating grooves in housing 80, provide the necessary oil seals for the type of operation contemplated where bearing assembly is at the bottom of a vertically disposed shaft 32.

Located in the sealing chamber 16A is a first viscoseal-type sealing screw 51 which in this embodiment is located on shaft 32, but which could be located on the inner wall of sealing chamber 16A. The circumferentially extending, radially projecting ribs of screw 51 are adapted to form in cooperation with fluid (e.g., a melt) from input chamber 12 a seal between shaft 32 and housing 9 when input chamber 12 has first been depressurized after being pressurized with prechosen fluid at a predetermined pressure and then depressurized to a predetermined extent in annulus 71 of input chamber 12 and when shaft 32 is rotating at a predetermined speed. Though the ribs of screw 51 are helical in the embodiment shown in a particular positive configuration (relative to the direction of shaft rotation) which thus moves fluid from annulus 71 toward a second viscoseal screw means 52, it will be appreciated that any convenient screw design can be employed here which will perform the indicated functions desired.

Located in the sealing chamber 16B in a second visco-seal-type sealing screw 52 which in this embodiment is located on shaft 32, but which could be located on the inner wall of the sealing chamber 16B. The circumferentially extending, radially projecting ribs of screw 52 are adapted to form in cooperation with fluid from input chamber 12 a seal between shaft 32 and housng 9 when shaft 32 is rotating at a predetermined speed and when input chamber 12 has been pressurized to a predetermined extent so that fluid flows therethrough from input conduit 20 into process chamber 13 through annulus 71. Also, these ribs of screw 52 are spiraled in a direction to force fluid upward toward screw 51 and annulus 71 when the input chamber 13 is pressurized in a normal manner to a predetermined extent and fluid is flowing through annulus 71 from input conduit 20 into process chamber 13 and when shaft 32 is rotating at a predetermined speed. Though the ribs of screw 52 are spiraled in a particular reverse configuration (relative to the direction of shaft rotation) which moves fluid away from chamber 16B towards screw 51 and thus in effect pumps fluid towards process chamber 13 past sealing chamber 16A, it will be appreciated that any convenient screw design can be employed here which will perform the indicated functions desired.

To provide a reservoir and pressure equalization region, shaft 32 may be optionally provided with a groove 74 which circumferentially extends around shaft 32 between sealing screw 51 and sealing screw 52.

The second viscoseal screw 51 is designed so that it will generate at all expected operating conditions of shaft rotational speed and fluid viscosity a pressure at least equal to the pressure difference between the interior and exterior of separation chamber 13 (typically atmospheric pressure). The pressure at the end of second viscoseal screw 51 is therefore always higher than the pressure existing in the input chamber 12 by the pressure generated by the second viscoseal screw 51. This pressure is opposed by first viscoseal screw 52, which urges inwards toward the input chamber 12. The first viscoseal screw 52 is designed so that its pressure generating capability exceeds the maximum pressure which can be generated by the second visco-seal screw 51 plus any expected pressure in the inlet chamber 12.

Based upon normal expected operating shaft speed and fluid viscosity, the area and length of the annulus 71 are selected so that the pressure at the melt entering port 20 is greater than the pressure of the atmosphere surrounding the machine. At this time, the second viscoseal screw 51 is completely filled and the first viscoseal screw 52 fills to the point required to equal the melt inlet pressure plus the pressure generated by the second viscoseal screw 51. In this way, there is no leakage or gas or fluid from the outside into the separation chamber 13. When the melt inlet flow is interrupted or decreased greatly in magnitude, the pressure at the melt inlet port 20 may fall to less than that of the surrounding atmosphere. However, no leakage into the separation chamber 13 occurs because the second viscoseal screw 51 continues to operate on the fluid remaining in it and in the input chamber 12 to generate enough pressure to oppose the entrance of gas or fluid from the outside along the shaft 32.

Typically one or two complete (360°) turns of a suitable rib on a screw 51 are generally sufficient and even preferred in the practice of the present invention. When there is a failure or drop off in such normal operating fluid pressure so that fluid no longer flows in annulus 71, some residual fluid remains entrained in the second viscoseal screw 51; and then under such a mode of operation, a seal is formed between shaft 32 and housing 9 by screw 51 which prevents what would otherwise be a loss of pressure in process chamber 13, as by an inrush of atmospheric air through, successively, shaft input port 50 (as when process chamber 13 is being maintained under subatmospheric pressures), past sealing screw 51, through annulus 71, and into chamber 13. However, with a seal formed by screw 51 and fluid as shaft 32 rotates such loss of pressure does not occur.

In any given specific embodiment of the present invention, the axial length and radial breadth of annulus 71 are each so chosen as to maintain the normal pressure of fluid fed thereinto from conduit 20 at a level sufficient to activate and make operative screw 52 for purposes of achieving the desired seal in sealing chamber 16B with fluid as shaft 32 rotates. As soon as fluid reaches chamber 13, in annulus 71, fluid pressure dissipates (as happens, for example, in normal operation of devolatilizer 8). If the annulus 71 maintains insufficient pressure as by letting fluid pass too rapidly therethrough, there is insufficient fluid force exerted on screw 52 to make the desired seal; if to the contrary, the annulus 71 maintains too much pressure, as by letting too little fluid pass therethrough, there is excessive force exerted on screw 52, and insufficient pressure is dissipated in screw 52 to completely contain fluid. Since in a typical situation where an embodiment of an assembly of this invention is employed, the reduced pressure in the process chamber 13 may commonly be easily controlled at a constant, or nearly so, value, this fact can sometimes be advantageously used in design of screw 51. The relatively high pressures associated with fluid movement through annulus 71 may be more variable from an average value so this fact should be considered in design of screw 52.

Typically shaft speeds for an embodiment of this invention range from about 5 to 2,000 revolutions per minute, though faster and slower speeds may be employed, as those skilled in the art will appreciate.

In designing a viscoseal screw, one selects a screw which will produce the desired pressure having regard to the existing condition of shaft speed, shaft diameter, fluid viscosity and the limiting construction dimensional tolerances. Calculation methods described by Schenkel [Schenkel, Gerhard, *Plastics Extrusion Technology and Theory*, London, Iliffe Books, Ltd. (1966), page 98, et seq.] may be used to estimate the pressure developed by a given viscoseal screw. Thus, the total flow Q developed by a screw pump consists of three partial flows combined in the equation:

$$Q = Q_D - Q_P - Q_L$$

wherein $Q_D$ (the drag flow) is the axial flow from low to high pressure generated by the interaction of the screw with its housing;

$Q_P$ is the axial flow from high to low pressure along the grooves as a result of the pressure gradient along the groove; and $Q_L$ is the axial flow from high to low pressure over the screw lands as a result of pressure difference between adjacent grooves.

In the viscoseal screw described in this disclosure of the invention, there is no net fluid flow in seal at steady operating conditions; therefore $Q = 0$.

$$Q_D = Q_P - Q_L = 0$$

These three terms may be calculated from the following equations:

$Q_D = \pi^2 d^2 h n \sin \phi \cos \phi / 2$
$Q_L = (\pi^2 d^2 \delta^3 \tan \phi / 12 \eta' e) \cdot (p_2 = p_1/l_2)$ wherein $d$ = screw diameter
$h$ = groove depth
$\phi$ = helix angle of thread
$\tan \phi$ = pitch of thread/$d$
$e$ = land width
$\delta$ = radial clearance of lands
$n$ = number of thread starts
$\eta$ = fluid viscosity in grooves
$\eta'$ = fluid viscosity over lands
$l_2$ = effective axial length of screw
$p_2$ = pressure at high pressure end of screw
$p_1$ = pressure at low pressure end of screw In designing a viscoseal screw, various values of $d$, $h$, $e$, $\phi$, $\delta$, and $n$ are assumed, and the length $l_2$ is calculated. When a combination which gives a reasonable length is found, that design is selected. In using the equations, the various terms may be expressed in any set of consistent engineering units.

In designing the length of diameter of the annulus, the well known equations for calculating the pressure drop for liquid flowing through an annulus are employed. These equations are given by Schenkel on pages 114-115.

Figure 3:
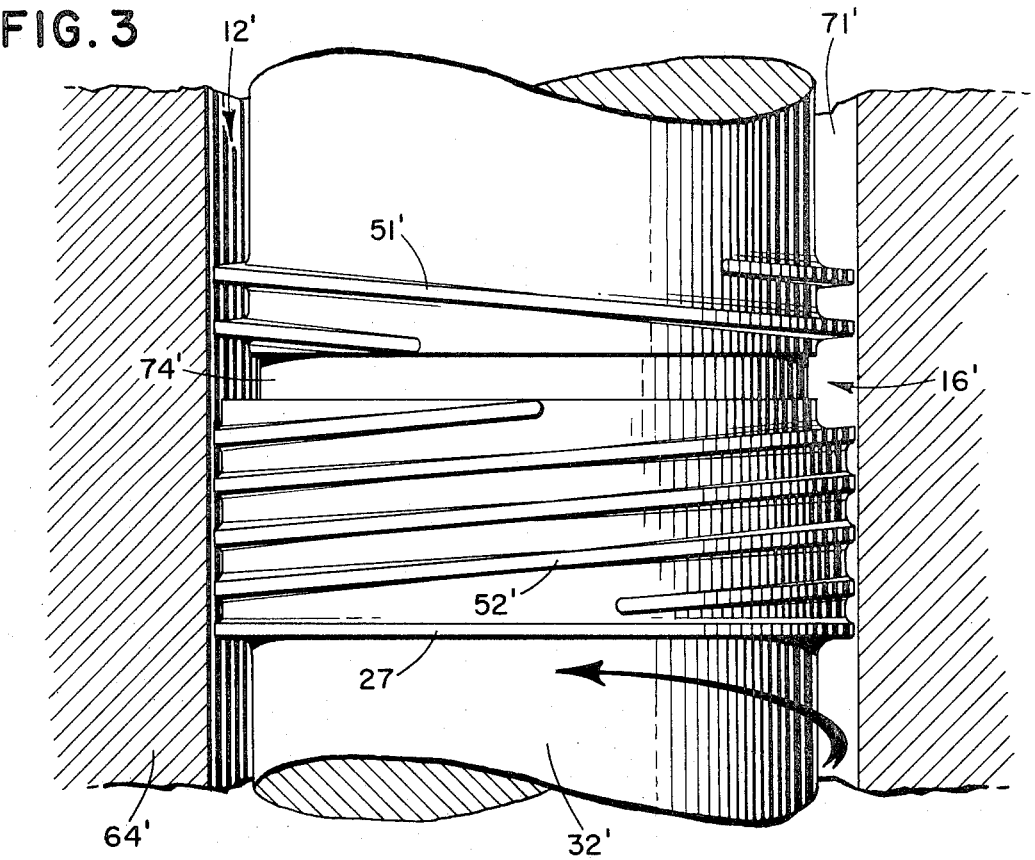
FIG. 3 is an enlarged, vertical sectional view of an alternative embodiment of a viscoseal-type sealing screw arrangement suitable for use in the embodiment shown in FIG. 2 having a nonintegral circumferential end dam.

In FIG. 3, there is seen an alternative embodiment of a sealing chamber which employs a pair of viscoseal type sealing screws 51' and 52'. In this description, for convenience, it will be appreciated that, in a Figure wherein there is a numeral with one or two or three prime marks appended thereto, such primed numeral designates a first or a second or a third embodiment, respectively, wherein the part or element so designated is like or similar to a part or element identically numbered, but without prime marks in the embodiment of FIGS. 1 and 2. In the embodiment of FIG. 3, at the rear (relative to separation chamber 13) of screw 52', a circumferentially extending dam 27 is located. Dam 27 is in the form of a ridge and functions to prevent leakage as by gravitational dripping action from the region of melt sealing chamber 16 downwardly when shaft 32' is not rotating after a period of operation when the input chamber 12' is no longer pressurized, as with fluid. Dam 27 forms no part of screw 52' as such, as those skilled in the art will appreciate.

Figure 4:
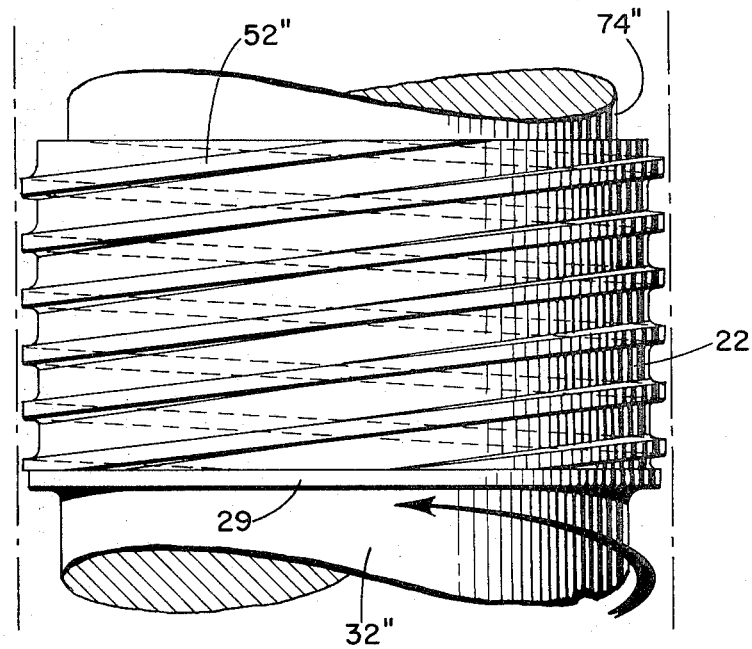
FIG. 4 shows a further alternative embodiment of the lower one of the two viscoseal-type sealing screw arrangements shown in FIG. 2 having an integral end dam.

In FIG. 4 is shown an alternative embodiment for a viscoseal type sealing screw 52, this alternative embodiment being herein designated in its entirety by the numeral 52" and being adaptable for use in sealing chamber 16B (see FIG. 2). Screw 52" has multiple threads and is equipped with a dam 29. Dam 29 is in the form of a ridge and functions cooperatively with the threads of screw 52" to effectively lengthen the effective length of channel 22 in screw 52"; while the radial ridge height of dam 29 is shown less than the height of the threads of screw 52", dam 29 can have a height approximately that of such threads, if desired, depending upon individual intended use considerations as those skilled in the art will appreciate. Screw 52" is seen to employ two threads and three turns, though more threads and/or turns may be used if desired. As in the case of the other figures herein, arrows indicate the direction of shaft rotation. Dam 29 is an integral part of the viscoseal screw 52".

Figure 5:
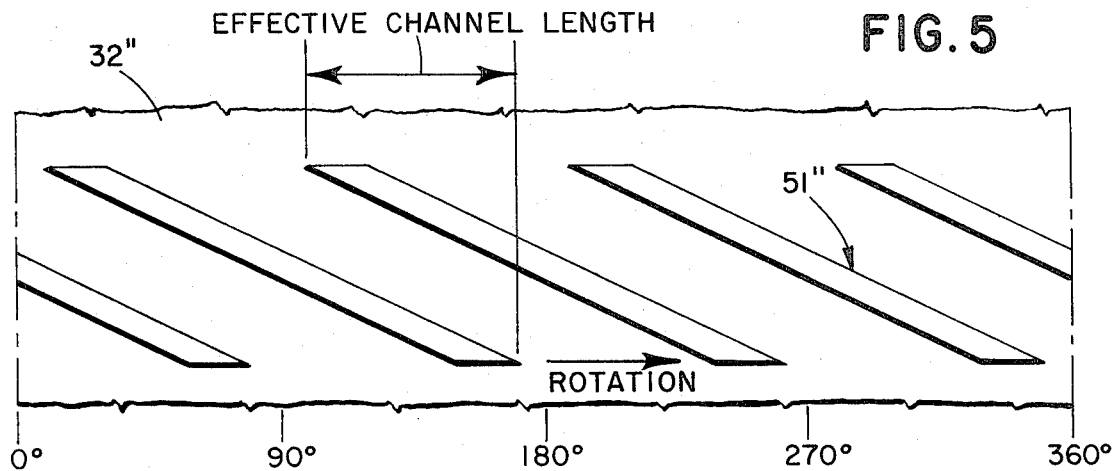
FIG. 5 shows a further alternative and multiple thread embodiment of the upper one of the two viscoseal-type sealing screw arrangement shown in FIG. 2, but shown in the form of a developed side elevation.

In FIG. 5 is shown an alternative embodiment for a viscoseal-type sealing screw which is herein designated in its entirety by the numeral 51" and which is adaptable for use in sealing chamber 16A (see FIG. 2). The individual threads of screw 51" each do not circumferentially circumscribe shaft 32" but rather extend only a short distance helically about shaft 32". Effective channel length between circumferentially adjacent threads of screw 51" is labeled in FIG. 5.

Figure 6:
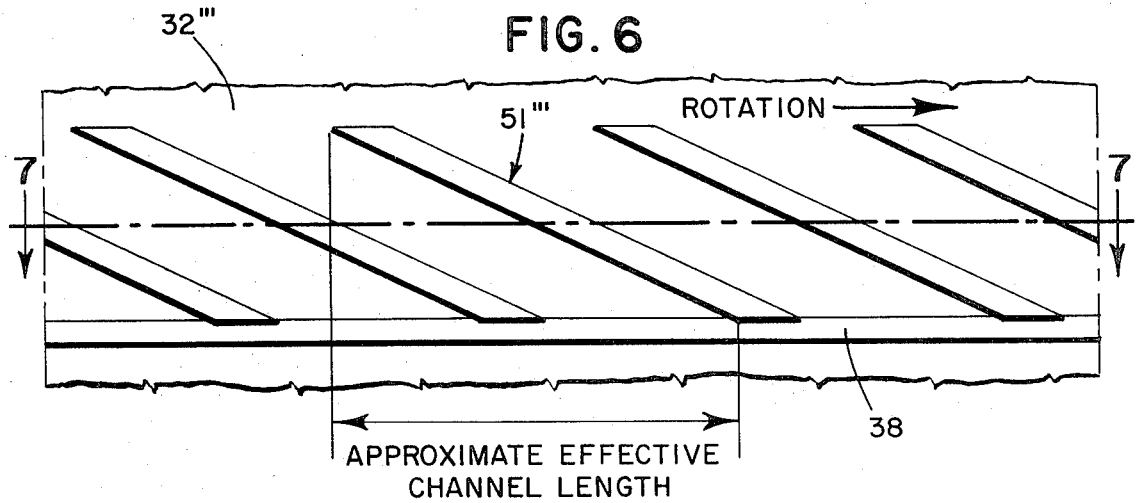
FIG. 6 shows an embodiment similar to FIG. 5 shown in the same form, but with an integral circumferential end dam.
Figure 7:
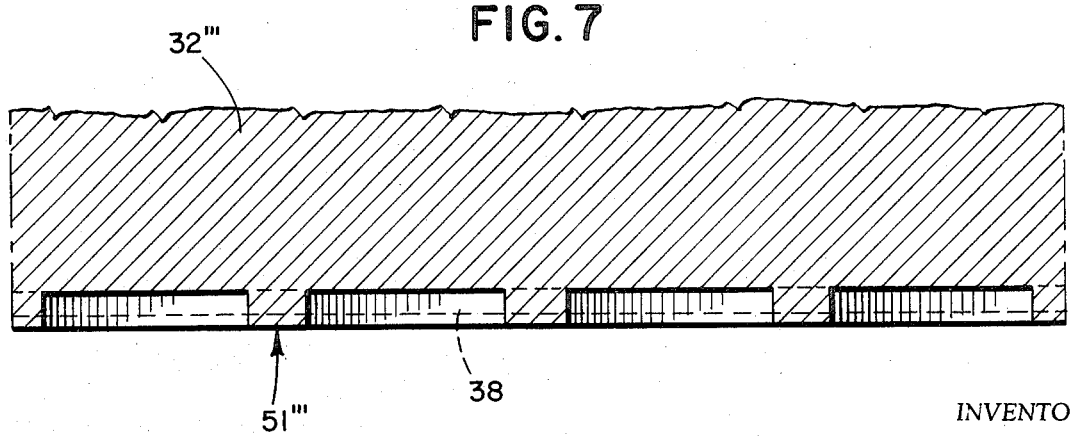
FIG. 7 is a sectional view taken along the line 7—7 of FIG. 6.

In FIGS. 6 and 7 is shown a further alternative embodiment for a viscoseal-type sealing screw which is herein designated in its entirety by the numeral 51''' and which is adaptable for use in sealing chamber 16A (see FIG. 2). Screw 51''' is similar to screw 51" generally but is equipped with an integral dam 38 which effectively lengthens the useful channel length between circumferentially adjacent threads of screw 51''' as labeled in FIG. 6. While the radial height of dam 38 is shown in FIGS. 6 and 7 as being less than that of the associated threads of screw 51''', this height of dam 38 can approximate that of such threads, if desired, depending upon individual intended use considerations, as those skilled in the art will appreciate. The end dam 38 should be located at the end of screw 51''' furthest away from the input chamber 12 (see FIG. 2).

In the embodiments described above, the viscoseal screw threads are shown to be part of the rotating shaft and the housing enclosing them to be a smooth cylinder. It will be appreciated by those skilled in the art that the device will operate equally well if the threads are cut in the housing and the shaft surface is smooth. It will also be appreciated that the housing and threads need not necessarily be cylindrical. One can use any housing-thread configuration which has circular symmetry about the axis of the shaft, such as a frustrum of a cone, is feasible and practical, and does not depart from the spirit and scope of the present invention.

For example, a devolatilizer with a sealing chamber 16 and an input chamber 12 generally similar to that shown in FIG. 1 is designed to treat a polystyrene melt stream containing up to 50 percent styrene monomer and similar volatile materials to remove substantially all the volatile materials. This devolatilizer is provided with an inlet chamber 12 and a sealing chamber 16 similar to those shown in FIG. 1.

The dimensions of the second viscoseal screw 51 and its housing and of the first viscoseal screw 52 and its housing are as follows:

|  | 2nd Viscoseal Screw | 1st Viscoseal Screw |
|---|---|---|
| Screw diameter | 6.76 inches | 6.76 inches |
| Groove depth | 0.35 inch | 0.14 inch |
| Helix angle of thread | 4°59' | 4°59' |
| Land width | 11/64 inch | 11/64 inch |
| Radial clearance of land | 0.058 inch | 0.020 inch |
| Number of thread starts | 4 | 3 |
| Axial length of screw | ¾ inch | 2 ¾ inches |

The dimensions of the annular input chamber 21 were

Length of chamber — 13 13/16 inches

Inside diameter of housing — 6.8 inches

Diameter of shaft — 6.0 inches

The machine was operated at various conditions within these ranges:

Monomer concentration — 0.5 - 50 percent

Shaft speed — 40 - 120 rpm

Temperature — 120° - 250°C

Pressure in separation chamber 13 — 3 - 500 Torr

Under all conditions used, there is no detectable leakage of air into the separation chamber.

It will be appreciated that while the embodiments of the present invention, as shown as described herein are depicted in combination with a particular wiped film devolatilizer, the present invention can be utilized with any devolatilizer, extruder, or the like, to achieve pressurized, viscous fluid feed intermittently to a chamber at low or high pressure along a shaft sealed with a screw means as taught herein; and it will be further appreciated that many variations and modifications of the present invention are feasible and practical without departing from the spirit and scope of the invention disclosed and claimed herein.

What is claimed is:

1. A feed assembly adapted to deliver circumferentially of a revolving shaft a pressurized fluid mass intermittently to a chamber maintained under reduced pressure relative to the entering fluid mass, said assembly comprising:

A. a substantially gas tight, fluid tight, generally elongated housing,
  1. said housing having defined therewithin at successive adjacent adjoining regions generally along a common axis extending therethrough
    a. a first radially symmetrical sealing chamber generally coaxial with said axis,
    b. a second radially symmetrical sealing chamber generally coaxial with said axis,
    c. a fluid input chamber generally coaxial with said axis, and
    d. a process chamber adapted to be maintained at a predetermined relatively low pressure,
  2. said housing having defined therein
    a. a shaft input port axially located adjacent said first sealing chamber, and
    b. a fluid input port circumferentially located in said input chamber adjacent said second sealing chamber,
  3. said housing in the region of said sealing chambers and said housing through said fluid input port and exiting therefrom into said process chamber,
B. a revolvably mounted shaft generally coaxial with said axis and extending through said shaft input port, said sealing chambers, and said input chamber, and into said process chamber, said shaft in said input chamber defining in combination with said housing an annular space circumferentially thereof adapted for the flow of fluid therethrough and into said process chamber from said fluid input port,
C. a first viscoseal-type sealing screw located in said first sealing chamber and associated with either said shaft or said housing, the circumferentially extending radially projecting ribs thereof being adapted to form in cooperation with fluid from the input chamber when said input chamber has pressurized fluid flowing therethrough and when said shaft is rotating at a predetermined speed a seal between said shaft and said housing,
D. a second viscoseal-type sealing screw located in said second sealing chamber and associated with either said shaft or said housing, the circumferentially extending, radially projecting ribs thereof being
  1. adapted to form in cooperation with fluid from said input chamber when said shaft is rotating at a predetermined speed and when said input chamber has been first pressurized with fluid and then depressurized up to an extent that no fluid flows therethrough a seal between said shaft and said housing, and
  2. adapted to permit passage of fluid through said second sealing chamber to said first sealing chamber from said input chamber when said input chamber has pressurized fluid flowing therethrough and when said shaft is rotating at a predetermined speed.

2. The assembly of claim 1 wherein said first viscoseal-type sealing screw has ribs so positioned as to urge fluid away from said first-sealing chamber towards said second-sealing chamber when said input chamber has pressurized fluid flowing therethrough and when said shaft is rotating at a predetermined speed.

3. The assembly of claim 1 wherein said second viscoseal-type sealing screw has ribs attached thereto and so positioned as to conduct fluid through said second-sealing chamber from said input chamber to said first sealing chamber when said input chamber has pressurized fluid flowing therethrough and when said shaft is rotating at a predetermined speed.

4. The assembly of claim 1 wherein the threads of said first sealing screw are attached to said shaft.

5. The assembly of claim 1 wherein the threads of said second sealing screw are attached to said shaft.

6. The assembly of claim 1 wherein the threads of said first sealing screw are attached to said housing.

7. The assembly of claim 1 wherein the threads of said second sealing screw are attached to said housing.

* * * * *

UNITED STATES PATENT OFFICE
CERTIFICATE OF CORRECTION

Patent No. 3,795,386      Dated March 5, 1974

Inventor(s) Don E. Carter and George A. Latinen

It is certified that error appears in the above-identified patent and that said Letters Patent are hereby corrected as shown below:

Column 8, lines 51 to 53, after the equation for $Q_D$ and before the equation for $Q_L$ insert the following equation:

$$Q_p = \frac{\pi d h^3 \sin^2 \phi}{12 \eta} \cdot \frac{P_2 - P_1}{l_2}.$$

Signed and sealed this 17th day of September 1974.

(SEAL)
Attest:

McCOY M. GIBSON JR.
Attesting Officer

C. MARSHALL DANN
Commissioner of Patents